United States Patent [19]
Logan et al.

[11] Patent Number: 5,968,121
[45] Date of Patent: Oct. 19, 1999

[54] METHOD AND APPARATUS FOR REPRESENTING AND APPLYING NETWORK TOPOLOGICAL DATA

[75] Inventors: Keith W. Logan, Redmond; Pradyumna K. Misra, Issaquah; Paul J. Leach, Seattle; Clifford P. Van Dyke, Bellevue; Dave D. Straube, Redmond; Arnold S. Miller, Bellevue, all of Wash.

[73] Assignee: Microsoft Corporation, Redmond, Wash.

[21] Appl. No.: 08/910,412

[22] Filed: Aug. 13, 1997

[51] Int. Cl.[6] .................................................. G06F 17/30
[52] U.S. Cl. ............................................................. 709/219
[58] Field of Search ........................ 707/10; 395/200.47, 395/200.48, 200.49; 709/217, 218, 219

[56] References Cited

U.S. PATENT DOCUMENTS 5,649,194   7/1997   Miller et al. .

OTHER PUBLICATIONS

Luotonen et al., "World Wide Web Proxies", *Computer Networks and ISDN Systems*, vol. 27, No. 2, Nov. 1994, pp. 147–154.

Baentsch et al., "Introducing Application–Level Replication and Naming into Today's Web", *Computer Networks and ISDN Systems*, vol. 28, No. 11, May 1996, p21–930.
International Telecommunication Union, ITU–T Recommendation X.500, 1993.
International Telecommunication Union, ITU–T Recommendation X.520, 1993.
International Telecommunication Union, ITU–T Recommendation X.525, 1993.
Guyton et al, Locating Nearby Copies of Replicated Internet Servers, SIGCOMM 95, ACM, 1995.
Gwertzman et al, The Case for Geographic Push–Caching, Technical Report Harvard University, 1994, printed by IEEE, 1995.

*Primary Examiner*—Ellis B. Ramirez
*Attorney, Agent, or Firm*—Leydig, Voit & Mayer, Ltd.

[57] ABSTRACT

A network directory and naming service include fields for identifying instances of network resources and other objects by both logical and topological grouping. This combination of information facilitates automated efficient decision making with regard to replication of resources and updating the replicas in response to changes. The combination of logical and topological identification for resources also facilitates selection of a close replica in instances where a client requests access to a resource, such as a server, for which communicatively local and remote instances exist.

20 Claims, 13 Drawing Sheets

| Site Name | 100 |
| --- | --- |
| Site GUID | 102 |
| Description | 104 |
| Notification List | 106 |
| Global Coordinates | 108 |
| Map Reference | 110 |
| Metrics | 112 |
| Intersite Repl Schedule | 114 |
| Intrasite Repl Schedule | 116 |

FIG. 6

| AppName | 120 |
| --- | --- |
| Object ID | 122 |
| Description | 124 |
| ApplicationID | 126 |
| Notification List | 128 |
| ConsistencyCheckerDLL | 130 |
| ConsistencyCheckerID | 132 |
| Intersite Repl Schedule | 134 |
| Intrasite Repl Schedule | 136 |
| AutoConnections | 138 |
| AutoConnectionOptions | 140 |

FIG. 7

|  | SITE 1<br>Los Angeles | SITE 2<br>Chicago | SITE 3<br>Redmond |
|---|---|---|---|
| SITE 1 | -- | 2 (via Site 3) | 1 |
| SITE 2 | 2 (via Site 3) | -- | 1 |
| SITE 3 | 1 | 1 | -- |

FIG. 17

| Machine(Site,ID) |
|---|
| Machine(1,1) |
| Machine(1,2) |
| SITE MARKER |
| Machine(3,1) |
| Machine(3,2) |
| SITE MARKER |
| Machine(2,1) |

FIG. 18

METHOD AND APPARATUS FOR REPRESENTING AND APPLYING NETWORK TOPOLOGICAL DATA

FIELD OF THE INVENTION

The present invention relates generally to the field of network resource administration, and more particularly, to methods and means for managing resources, such as directory service objects, within a network including a variety of users and resources at communicatively remote locations.

BACKGROUND OF THE INVENTION

Known directory services (DSs) include directory information trees (DITs) arranged to represent and organize directory service (DS) objects according to the location of the particular objects within the network (e.g. remote geographic locations such as Miami office, New York office, and Los Angeles office within an organization, or even non-permanently linked LAN A, LAN B, and LAN C).

Organizing directory services, or any resource locating mechanisms, according to location works well when searches for network resources and attempts to access the network resources are closely tied to network location, such as when the Research and Development resources are maintained at location X, sales and marketing at location Y, etc. Novell Netware 4.0 includes a directory service wherein a network directory of resources is divided at a highest level according to location and then at lower levels to particular organizational groups of resources at each of the locations provided at the highest level.

However, problems arise in locating resources when an organization's groups are not localized (to fit the organization of the directory). In such instances resources associated with a particular group, such as a "research and development" group, within an organization are present at a number of nodes within a DIT for the company due to the "geographic" diversity of the group. Searching for particular resources requires searching the various locations of the DIT.

Known directory service arrangement schemes also include DITs that represent and organize directory service objects according to a business structure of an organization (e.g. research and development, accounting, marketing, sales, etc. . . . ). Such DITs enable an administrator to arrange network objects according to the logical (e.g., business) relationships between various objects in the network. When an organization uses such a directory service, the resulting DIT typically embodies and resembles the arrangement of business groups within the organization. An example of a directory service incorporating this type of object arrangement is found within Novell Netware 4.1, wherein a network directory is divided at the highest levels into various administrative groups within an organization. Lower levels represent network objects associated with the particular groups designated at the highest level of the DIT.

Organizing a directory service of objects according to logical (business) grouping provides advantages over geographic grouping of objects when the directory service resources identified within the DIT are typically associated with particular business purposes. For example, a particular client database may be accessed exclusively by a sales department. It is advantageous that such a resource is not listed within, and thus cluttering, a portion of a directory service of objects that is accessed by non-sales users. A directory service model sub-divided at a highest level into organizational groups is particularly useful when most network resources are accessed at a relatively low cost. This is likely to occur only when the network resources and users are well connected via permanent, low cost, and high capacity links. On the other hand, in many organizations, resources associated with a given organizational group are distributed throughout the country or even the world, and these resources are accessed only at great cost.

Yet other known directory service arrangement schemes include DITs providing information relating to both location and organization. However, these known DITs lacked sufficient generality. In particular, a DIT for a corporation spanning a number of remote locations is initially divided according to location. At each location, the directory is sub-divided according to business unit. The specific implementations may vary from system to system depending upon how the system administrator sets up the DIT. In each case, the administrator attempts to minimize the impact of the costs of organizing the tree geographically versus logically.

In order to facilitate quick and efficient access to data, such as databases, directories, and programs, in a network extending to a number of remote locations, the data is replicated (i.e., stored at a number of locations within the network). For example, in a network comprising multiple local area networks (LANs) connected via non-permanent and/or relatively lower bandwidth wide area network (WAN) links, a replicated directory service of network resources may reside upon multiple machines within the communicatively remote LANs.

The use of an information unit to identify a geographic unit, subnetwork, or LAN within a network connected via one or more WAN links has been used in the Exchange Server and System Management Server products of Microsoft Corporation. Routers have also used a similar identification. The Network Link State and Open Shortest Path First protocols provide means for an administrator to assign costs to inter-network links. These costs are used by routers to determine the costs for various paths from a source node to a destination node in a network and use the computed costs to select an appropriate route. However, none of these prior art location-based solutions address or suggest solutions to the problem of designing and implementing directory services of network resources which present directory information in a manner that facilitates automated decision making for efficiently managing and carrying out network directory services.

SUMMARY OF THE INVENTION

The present invention is generally directed to a network operating system including a logical organization of objects and a topological description of the network to facilitate replicating and accessing objects and resources according to the ease with which they can be reached. The topological description of the network is provided in site objects. Site objects help to overcome a number of the troubling problems faced in performing various directory service operations associated with resources within a domain, including locating resources available at, or replicated across, a number of communicatively remote locations.

The site objects facilitate a general representation of the topological make-up of a network with regard to the aspect of network communication costs. All machines within a same site are assumed to be well connected. The site designations facilitate automatic separation of network entities into groups according to the general cost of communicating between the network entities.

The advantages provided by a directory service organized in the above described manner are clear. For example, a collection of machines existing within a directory service may be represented within the DIT according to their logical affiliation with other directory service objects. However, in accordance with the present invention, they are also represented according to their network topological location so that directory service decisions may be executed, such as replication, propagation, and replica selection, based upon the cost (as defined by the system administrator) of communication from a particular location.

BRIEF DESCRIPTION OF THE DRAWINGS

The appended claims set forth the features of the present invention with particularity. The invention, together with its objects and advantages, may be best understood from the following detailed description taken in conjunction with the accompanying drawings of which:

FIG. 6 illustratively depicts a set of properties associated with a site object datastructure;

FIG. 7 illustratively depicts a set of properties associated with a settings object for providing application specific site information;

FIG. 17 is a graphic depiction of a site inter-connection cost matrix for identifying connected sites and the number of links that must be traversed to send and receive data between the identified sites; and FIG. 18 is a site referral list computed for a particular site identifying preferred machines in accordance with the computed connection costs provided in the site cost matrix illustratively depicted in FIG. 17.

DETAILED DESCRIPTION OF THE DRAWINGS

Figure 1:
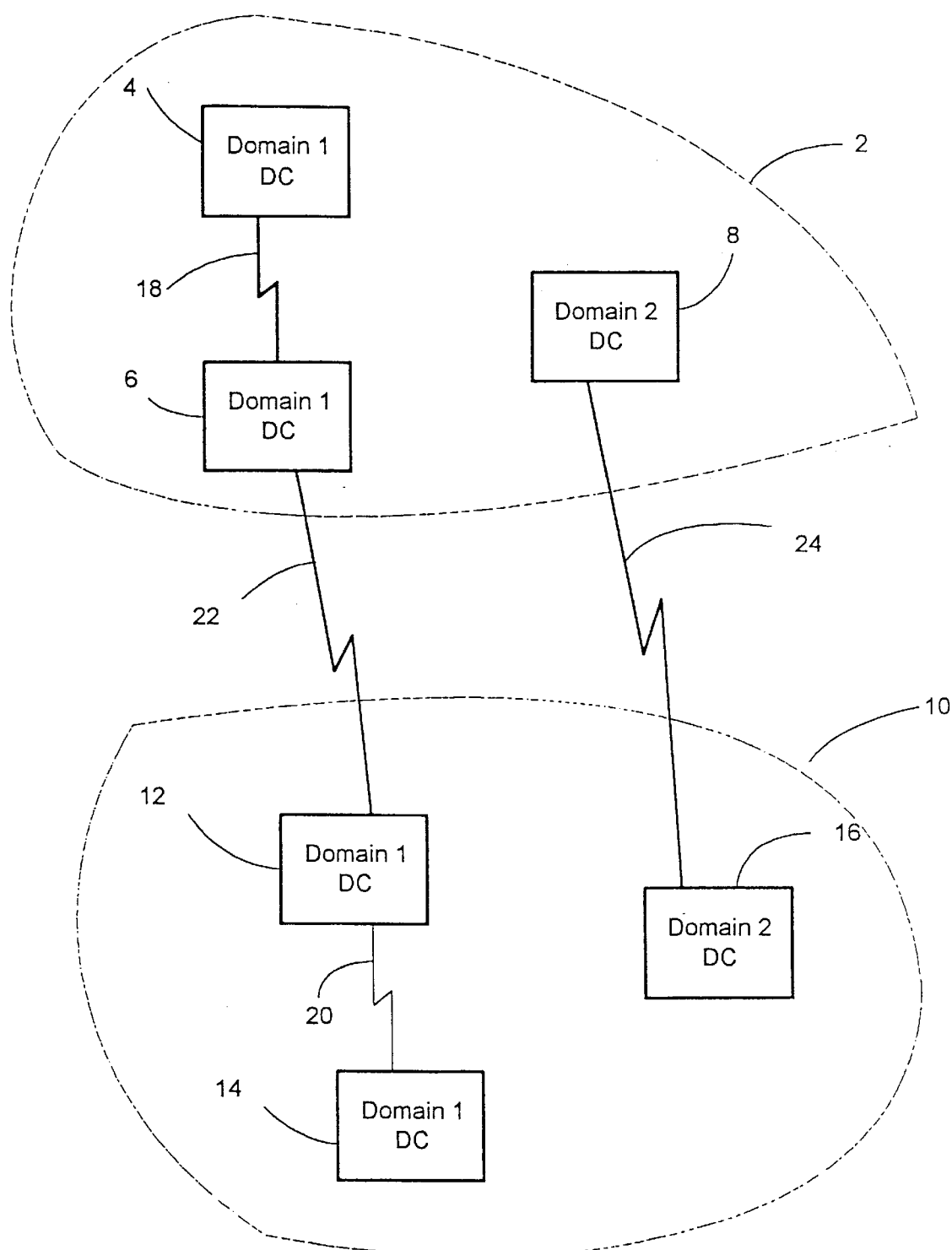
FIG. 1 is a schematic drawing of an exemplary network comprising a plurality of communicatively remote sites incorporating the present invention.

The present invention is particularly beneficial in a network environment where the resources, from which principals (i.e., users and services) in a network seek access, are sometimes replicated and exist at a number of remote devices within a network. The cost to access a resource located at a particular network location may differ from another node having a replicated copy of the same resource. In such an instance, it is typically desirable to access the instance of the resource which can be reached most directly and often at a lowest cost. The cost, as used herein arises from a number of factors including for example: the number of routing nodes that must be traversed ("hops"), the data rate of the traversed links, the priority of the requesting resource to use the particular routing links, the permanence of traversed links (e.g., permanently connected or dial-up), and the traffic volume on paths to the particular resource.

As used herein, a site represents a portion of network determined to have good connectivity. Good connectivity in accordance with an embodiment of the present invention is generally characterized by machines linked by relatively high-speed, reliable, and low cost paths. The determination of site membership may be determined, for example, based upon one or more of the following factors: (1) network type and links, (2) network bandwidth, (3) network size, (4) network traffic patterns, and network protocols.

For example, a set of clients, servers and/or domain controllers connected together via an Ethernet link to form a local area sub-network would generally be regarded as a single site in the context of the present invention. Of course, the definition of "good connectivity"—and thus site—is not limited to this single example. Rather, a site is a mechanism facilitating grouping resources according to relative network connectivity of widely distributed resources. Relatively good connectivity in one network may be considered relatively poor connectivity in another network.

It is expected that domains will exist over multiple sites. In some instances, a site will be associated with only a single domain. However, in other instances a single site will include network resources associated with multiple domains. Thus, sites (topological organization designations) and domains (logical designations) should be viewed as independent, yet complementary, designations enabling a network to provide and store information and services in an efficient and secure manner. An example of a network wherein multiple domains are represented within single sites is illustratively depicted in FIG. 1 described below.

Several conditions establish a criteria for determining site boundaries. Primary conditions for determining site membership are: (1) permanent network link connections, (2) adequate available bandwidth to support the expected communication levels within the site, and (3) a security mechanism for authenticating requests (accomplished between different domains via mutual trust relationships). Permanent network links ensure that there are no unnecessary latencies to establish network connections. Adequate bandwidth is determined by the volume of network traffic and therefore varies from network to network. Though not a requirement, all services within a site may use the same security service account to simplify security.

Secondary considerations for determining site membership include: (1) administration needs, (2) link use costs, (3) performance requirements, (4) directory replication needs, and (5) organizational factors. Administration overhead increases with the increase in the number of sites. Link use costs can be reduced by placing servers connected by an expensive WAN link into separate sites to reduce their exchange of data since intersite replication is typically less frequent than intrasite replication. Increasing the number of servers within a single site will increase traffic in the site and therefore degrade the response times at the site. If it is necessary for certain servers to have consistent replicated data, then this need is best met by assigning the servers to a same site. Finally, users of resources have different needs for particular resources and to the need to share such resources. It may be beneficial to place persons working together within the same site.

Turning to FIG. 1, an illustrative multi-site network consisting of multiple domains is provided. A Site 2 is schematically depicted. By way of example, the Site 2 includes a plurality of domain controllers 4, 6, and 8. Domain controllers 4 and 6 are associated with a domain identified as D1. Domain controller 8 is associated as well with the Site 2. Domain controller 8 is associated with another domain identified as D2. While not shown in FIG. 1, the domain controllers also include replicas of directory service databases for their respective domains. Those skilled in the art will appreciate that the sites also comprise clients, I/O devices and physical communication links such as an Ethernet link to enable communication between machines within the site.

Continuing with the description of the illustrative example of a network incorporating the present invention, FIG. 1 also includes a Site 10 comprising a plurality of domain controllers 12, 14, and 16. Domain controllers 12 and 14 are associated with domain D1. Domain controller 16, which is also associated with Site 10, is a member of domain D2.

In accordance with an embodiment of the present invention, domain controllers associated with a same domain maintain and reference replicas of security and directory service databases associated with their respective domains. However, the method of replication is independently designated for intersite and intrasite replication links. Replicas within a site are updated by means of a notification-based replication protocol. In particular, a domain controller will periodically notify other domain controllers with which it has established an intrasit replication link. The alerted domain controllers respond by polling the initiating domain controller for the changes. Domain controllers for which an intersite replication link has been establish seek (pull) updated information from other domain controllers by sending out requests to the other domain controllers to identify any changes to the databases after a particular reference time. These distinct replication techniques are described in detail in related patent applications: Raman et al. U.S. Ser. No. 08/739,948 "Replication Optimization System and Method" and Straube et al. U.S. Ser. No. 08/673,929 "Urgent Replication Facility" the teachings of both applications of which are expressly incorporated herein by reference.

Replication of these databases is facilitated by configurable intrasite and intersite replication links. Intrasite replication between domain controllers 4 and 6, and 12 and 14 is facilitated by intrasite replication links 18 and 20, respectively. Intersite replication between domain controllers 6 and 12, and 8 and 16 is facilitated by intersite replication links 22 and 24, respectively. Those skilled in the art will appreciate that the replication links 18, 20, 22 and 24 do not represent the physical hardware. Rather, the links 18, 20, 22 and 24 represent functional connections which are ultimately carried out on physical hardware operating under the control of a communication protocol.

Intrasite communication is relatively less costly than intersite communication. Therefore, to the extent possible, intersite replication links should be minimized by selecting one domain controller to perform replication between two sites. For example, in FIG. 1 the domain controllers 4 and 6 are both associated with domain D1. However, domain controller 6 is designated as the domain D1 intersite replicator for requesting updated information for Site 2 from Site 10. The information received by domain controller 6 from domain controller 12 is replicated relatively inexpensively via intrasite replication to the domain controller 4.

Assigning particular site identifications to domain controllers facilitates automated designation of one or more preferred intersite replication links between any two sites. While such a designation may seem trivial in the relatively simple network depicted in FIG. 1, this task becomes much more difficult in large complex subnetworks. Attaching site identifications to domain controllers facilitates using administrative software tools to query site information and based upon a criteria, automatically designate the intersite replicating domain controller for particular sites.

Figure 2:
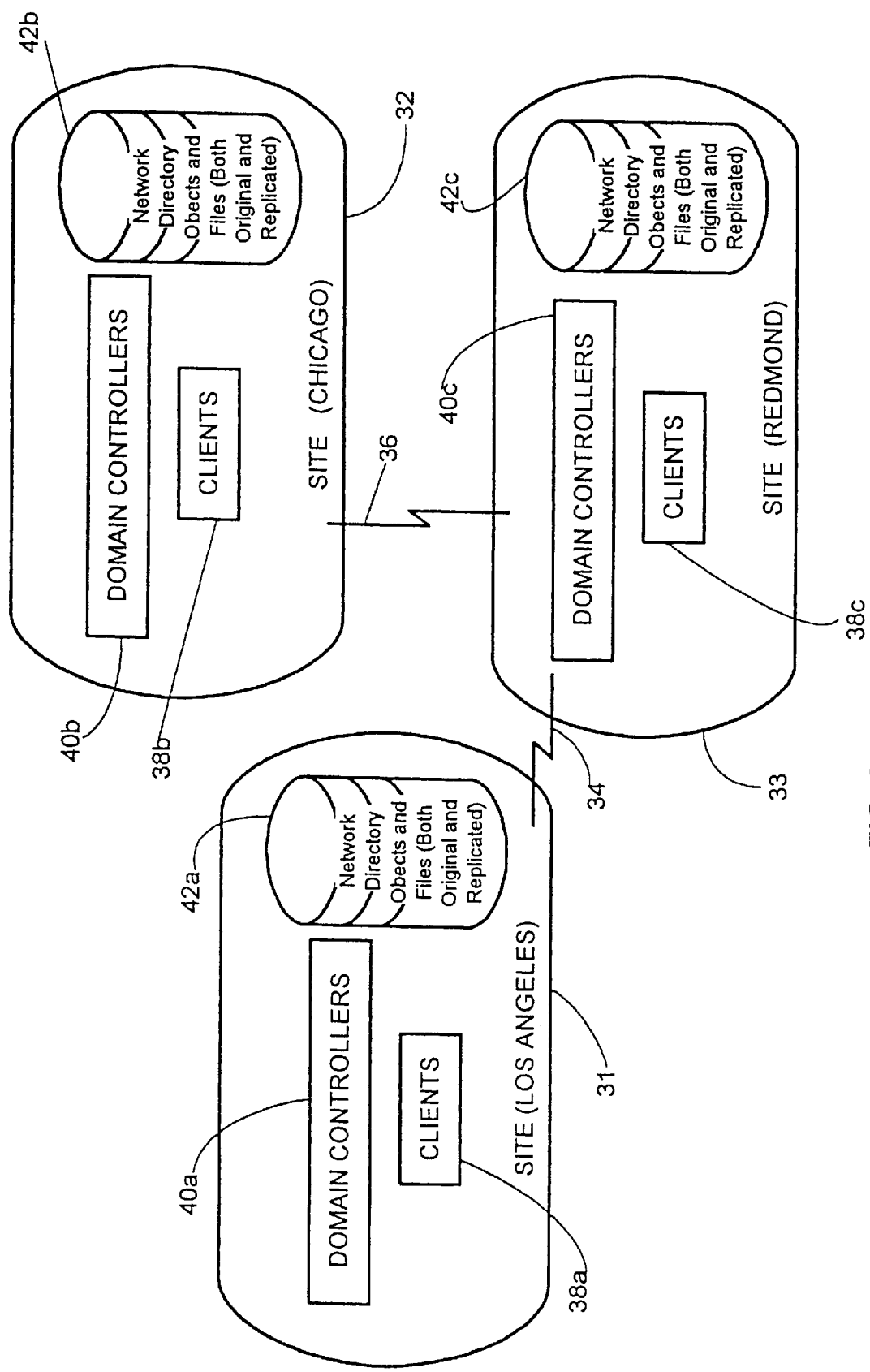
FIG. 2 is a schematic drawing illustratively depicting a domain including three communicatively remote sites.

Turning to FIG. 2, an illustrative multi-site domain for an organization comprising a Site 31 (Los Angeles), a Site 32 (Chicago), and a Site 33 (Redmond) is schematically depicted. In contrast to FIG. 1, all of the depicted machines are associated with a single domain. Intersite Link 34 connects Sites 31 and Site 33. As a result of the intersite Link 34 providing a direct connection between Site 31 and Site 33, Site 31 and Site 33 are each designated as neighbor sites in relation to the other directly connected site. Likewise, Site 32 and Site 33, directly connected via an intersite Link 36, are also neighbor sites in relation to one another. Site 31 and Site 32, though connected indirectly via Site 33, are not directly connected and therefore are not neighbor sites in relation to one another.

As shown in FIG. 2, each site includes client computers 38a, 38b, and 38c. The client computers 38a, 38b, and 38c are used by users and services to submit requests for resources to domain controllers 40a, 40b and 40c respectively. Such requests include requests for access to files and other resources located within and/or identified within network data storage devices 42a, 42b and 42c. In order to reduce delay in providing responses to user and service requests, files and directory objects are replicated to other sites within the domain so that an original or replica of the original is stored on the network data storage devices 42a, 42b, and 42c.

Figure 3:
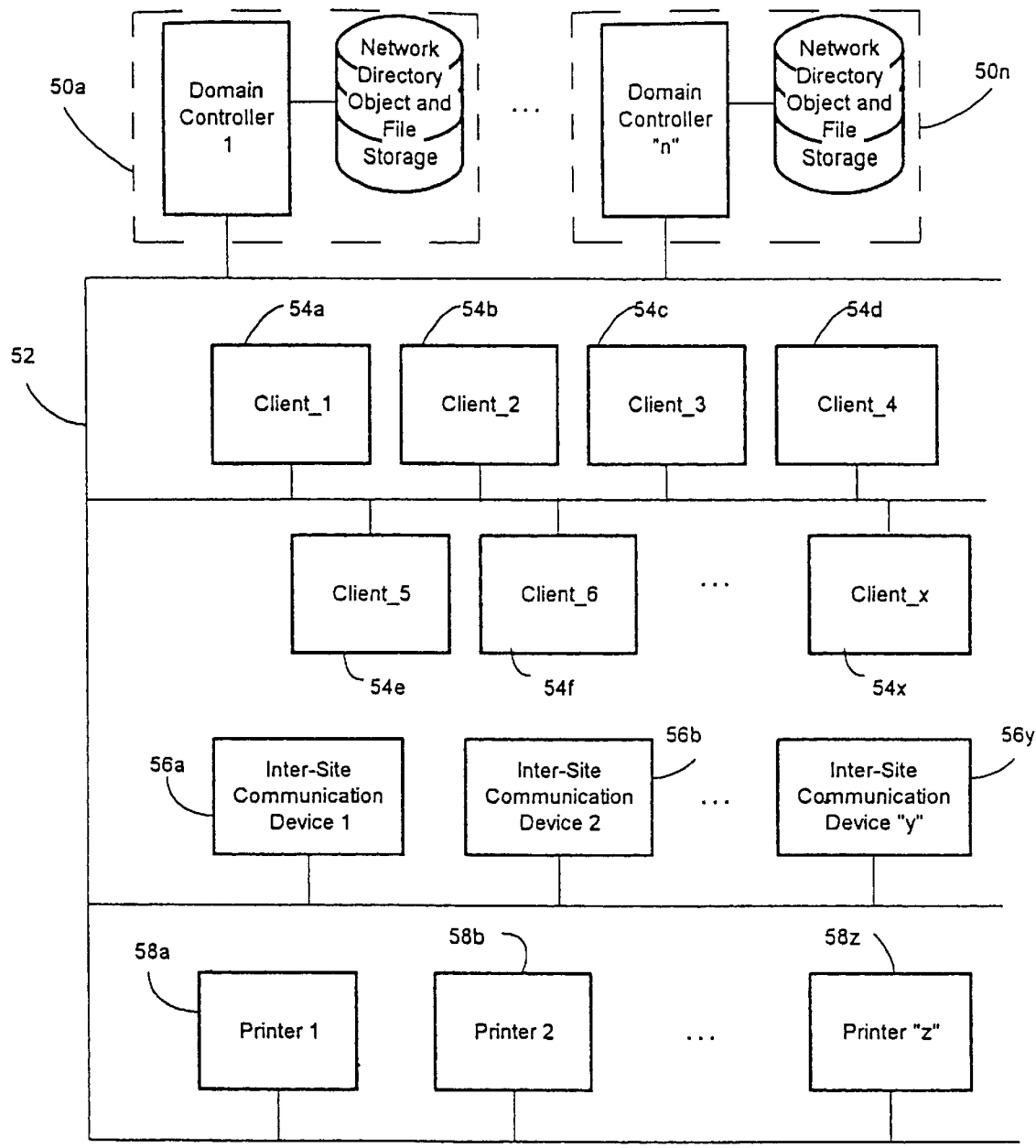
FIG. 3 is an illustrative schematic depiction of a local area network corresponding to the Los Angeles site in FIG. 2.

Turning to FIG. 3, by way of example, a LAN identified as Site 31 (Los Angeles) in FIG. 2, is schematically depicted. Other network topologies for a site will be known to those skilled in the art. The Site 31 comprises a plurality of domain controllers and associated network directory object and file storage devices 50a, 50n communicatively coupled to a local area network link 52 comprising, for example, an ETHERNET link. The devices 50a, 50n receive and respond to requests from client computers 54a, 54b, 54c, 54d, 54e, 54f, and 54x via the link 52.

In order to carry out communications with other sites, such as Site 33 via the link 34, Site 1 also includes a set of intersite communication devices 56a, 56b, and 56y. The intersite communication devices 56a, 56b, and 56y communicate with the domain controllers of the devices 50 and client computers 54 via the link 52.

Site 31 also includes additional I/O devices which will be known to those skilled in the art. For example, Site 31 includes Printers 58a, 58b, and 58z communicatively connected to the link 52. Other I/O devices will of course be contemplated by those skilled in the art.

Figure 4:
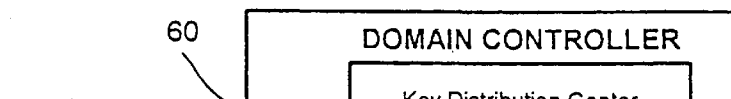
FIG. 4 is a schematic drawing illustrating functional sub-units of a domain controller facilitating site-based directory service, security, and file management operations including site related directory service operations in accordance with the present invention.

Having described the components of an exemplary site, attention is briefly directed to FIG. 4 which schematically depicts components associated with sites for an illustrative domain controller incorporating the present invention. The illustrated components in FIG. 4 enable domain controllers to perform well known domain controller file and directory service (DS) object management as well as other functions, including enforcing network resource security, in accordance with an embodiment of the present invention. The domain controller includes a key distribution center 60 that performs well known security services on behalf of the domain with which it is associated. The key distribution center includes a locator that responds to requests from clients during logon with one or more domain controllers with which the clients subsequently perform logon procedures and submit directory service requests. The manner in which the locator determines the identity and obtains information for such a domain controller is described below in conjunction with FIGS. 11–13. The domain controller also includes a directory service (DS) server 62 that performs a variety of tasks related to the maintenance of DS objects, identifying network resources (in the form of DS entries), and the addresses of resources in the network.

The DS comprises organization unit (OU) containers and site objects. The OU containers provide the desired hierarchical arrangement of DS objects (e.g., the business groups). The site objects describe regions of good connectivity within a network with which DS objects, identified within the OU containers, are associated. The domain controller also includes a distributed file system manager 64 for maintaining knowledge of the files stored upon the various volumes within a domain. Details regarding the organization and operation of the domain controller, including the KDC 60, the DS Server 62 and the distributed file system manager 64, are provided in Whitney et al. U.S. Pat. No. 5,701,462 entitled "Distributed File System" and Miller et al. U.S. Pat. No. 5,689,700 entitled "Unification of Directory Service With File System Services" the teachings of each application of which are expressly incorporated herein by reference.

Association of Network Object Types With Sites

As previously explained, in an embodiment of the present invention, specific instances of network entities are associated with no more than a single site at any given time. An instance DS object identified within an OU is associated at any given time with a single site. The assigned site is independent of the particular logical group with which the DS object is associated. As a result, in many cases DS objects associated with different logical groups will reside at a same site based upon the physical location of the objects in the network.

The DS object associated with a network server machine (e.g., a machine object) is dynamically assigned a site that is independent of its logical grouping. Additional server machines from different logical groups may reside within a same site. This dynamic assignment scheme is described in substantial detail herein below.

A client machine DS object is also assigned a site. The site is assigned to a client object based upon the site of the server performing logon authentication of the client when a user logs onto a network via the client machine, and thus the site assignment for a client machine is dynamic.

Having described the general network components associated with carrying out the present invention, attention is now directed to the data structures containing the network topology and policy information for carrying out site-based network functions.

Figure 5:
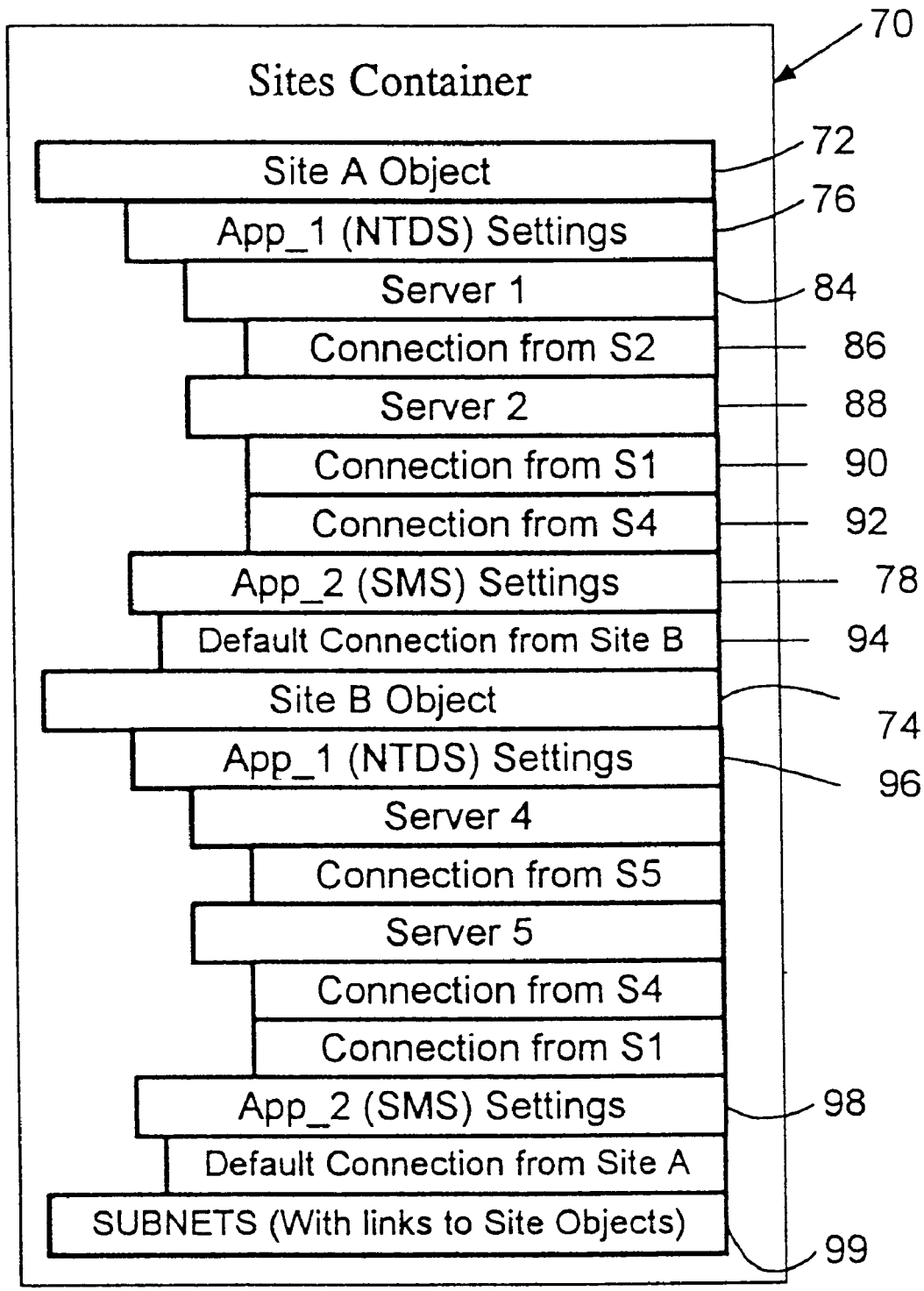
FIG. 5 is an illustrative example of a sites container and its constituent objects embodying the present invention.

Turning now to FIG. 5, by way of example, a sites container 70 is illustratively depicted. The sites container identifies all the sites in an enterprise, the domain controllers in those sites, and the replication topology. Thus, the illustrative example depicted in FIG. 5 and described below represents relatively simple site container which is sufficient to describe the present invention. However, many enterprises will be significantly more complex. Once defined, the sites container is utilized by various applications in accordance with the particular needs of the applications. An example of such applications is the directory service of resources in a network.

The sites container 70 comprises a site A object 72 and a site B object 74. The site objects 72 and 74 are containers for other objects which describe the associated sites. The components of site objects are described below with reference to FIG. 6.

Site objects include application specific settings objects. For example, an NTDS setting object defines directory service information specific to a particular site. Site A object 72 includes App_1 (NTDS) settings object 76 and App_2 (SMS) settings object 78.

Settings objects include server proxy objects for particular applications and connections associated with those particular identified servers. This arrangement allows each application to independently define its association with particular servers and each of the servers to define its own specific connections. The App_1 settings object 76 includes a server_1 proxy object 84 having a connection 86 from server_2, and a server_2 proxy object 88 having connections 90 and 92 from server_1 and server_4 respectively.

The App_2 settings object 78 does not include any specific server proxy objects. However, it does define a default connection 94 for App_2 from Site B which is server and connection independent. This example emphasizes the point that each application may independently define what additional objects will be referenced under the settings object for a particular site. The components of settings, server proxy, and connection objects are described below with reference to FIGS. 7, 8, and 9.

The site B object 74 includes application specific settings objects 96 and 98 including server proxy objects and connection objects similar to those identified above with regard to site A.

The sites container 70 also includes a Subnets container 99 comprising a set of subnet objects. A subnet is defined by a Subnet object in the configuration\Sites\Subnet container. Each Subnet object has a "SiteObject" property that links it to a site object. This link indicates that all clients with an IP address in the specified subnet are considered to be in the specified site. For instance, the subnet object named "157.55.80.00/20" (indicating the subnet of 157.55.80.00 and a 20 bit subnet mask) might have SiteObject property linking it to the Site A site object 72. This link indicates that all IP addresses in the 157.55.80.00/20 subnet are considered to be in the Site A site object 72. In an embodiment of the present invention, the SiteObject property within each subnet object is single valued. Thus, a single subnet maps to a single site. On the other hand, multiple subnet objects can be linked to a single site.

The objects and their site object properties are manually maintained by the DS administrator. Thus, a sanity check of the sundry subnets should be performed periodically to ensure that no subnet is mentioned by more than one site, and that all subnets are linked to a site.

The Configuration container (including all of the site and subnet objects in it) is replicated to all of the domain controllers in the enterprise (a linked set of domains). Each domain controller enumerates the site objects during startup. Thereafter, each domain controller is notified of any changes made to the site objects. The domain controllers use this information to build an in-memory subnet listing structure that is used to map from IP addresses to site names.

Turning to FIG. 6, the structure is depicted for a site object container. A site name 100 property stores a character string identifying the site. A site ID 102 property stores a globally unique object identification. Once assigned, the site ID is not changed. A description 104 property stores an optional set of comments providing a general description of the site such as "all machines on the North Campus." A notification list 106 includes a list of security principals to notify when problems arise at the site. The applications associated with settings objects may refer to the notification list 106 in instances when no principals are listed within the setting object notification list for the particular applications.

A Global Coordinates 108 property stores the global positioning system (GPS) location assigned to the site. The value stored in the global coordinates 108 is referenced in instances where a particular server object does not have a value designated for its global coordinates property. A map reference 110 property provides a path to mapping data which can be used to graphically render the site in the context of a larger geographic reference.

A metrics 112 property stores optional information regarding the expected performance or characteristics of media within the site.

The site object may also include replication scheduling properties. This information is not mandatory. Instead, this information is used as a fallback for applications that do not have replication scheduling information stored within their associated settings objects. An intersite replication schedule 114 specifies the frequency with which applications will poll other sites for changed information on a low, medium and high priority basis. An intrasite replication schedule 116 may specify the frequency with which applications will respond to notifications from other machines within a site for changed information on a low, medium and high priority basis.

Turning to FIG. 7, the structure is depicted for a settings object. A setting name 120 property stores a character string identifying the application with which the settings object is associated. A setting ID 122 property stores a globally unique object identification for the setting object. Once assigned, the setting ID is not changed. A description 124 property stores an optional set of comments providing a general description of the application with which the setting object is associated. An application name 126 property identifies the application which owns the particular settings object (e.g., NTDS). A notification list 128 includes a list of security principals to notify when problems arise at the site relating to the particular application.

Each settings object also includes a ConsistencyCheckerDLL 130 property specifying the name of an application specific DLL which can be invoked to check the site/application configuration. A ConsistencyChecker ID 132 property provides the application-specific code for the consistency checker for use in conjunction with the user interface. If identified, the consistency checker identified in the ConsistencyChecker ID 132 property takes precedence over the one identified in the ConsistencyCheckerDLL 130 property.

An intersite replication schedule 134 may specify the frequency with which the application will poll other sites for changed information on a low, medium and high priority basis. An intrasite replication schedule 136 may specify the frequency with which the application will respond to notifications from other machines within the site for changed information on a low, medium and high priority basis in instances where notification-based polling is the intrasite replication mechanism for an application.

An autoconnections 138 property holds a Boolean value included in the case where the settings object is associated with NTDS. The autoconnections 138 property indicates whether the system should automatically generate intrasite connections to achieve connectivity. If not set, then an administrator must set of the connections manually such that a path exists between each set of servers within the site for the particular application. An autoconnections options 140 property defines the automatic topology generation approach such as mesh, N-connected, etc. for the site.

Figure 8:
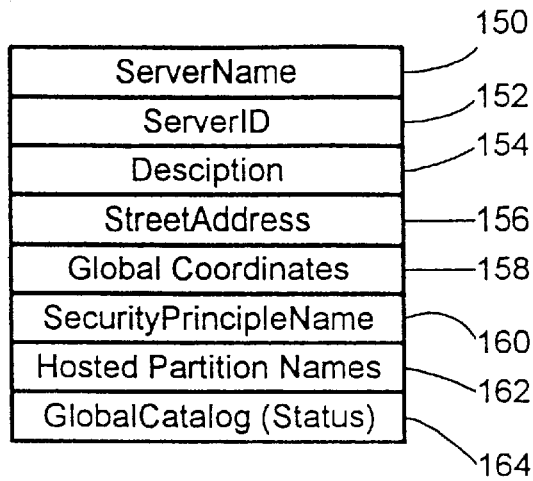
FIG. 8 illustratively depicts a set of properties associated with a server object for providing server specific site related information.

Turning to FIG. 8, the structure is depicted for a server proxy object. This is not the security principal for the server. That object resides under a domain container. Since the sites object is replicated globally, it is generally filled with relatively static information. Thus, the more dynamic characteristics should be stored in the applications themselves.

A server name 150 property stores a character string identifying the server with which the server proxy object is associated. A server ID 152 property stores a globally unique object identification for the server proxy object. Once assigned, the server ID is not changed. A description 154 property stores an optional set of comments providing a general description of the server object with which the server proxy object is associated.

A street address 156 property specifies the street address for the location of the server. A Global Coordinates 158 property stores the global positioning system (GPS) location assigned to the server. A SecurityPrincipalName 160 property specifies the server object which the server proxy represents in the site object container. The server name stored in the SecurityPrincipalName 160 is used to access properties of the machine account object for the named server.

A hosted partition names 162 property contains a list of the domain partitions hosted by the server. A global catalog 164 property is a Boolean value which indicates whether this particular server is a global catalog server.

Figure 9:
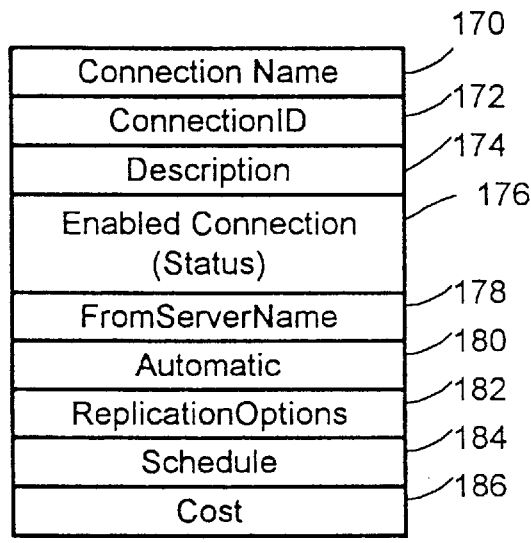
FIG. 9 illustratively depicts a set of properties associated with a server connection object for providing connection information relating to a specific connection from a server.

Turning to FIG. 9, the structure is depicted for a server connection object. Server connection objects represent the in-bound half of a link between two servers. A connection name 170 property stores a character string identifying the connection. A connection ID 172 property stores a globally unique object identification for the connection object. Once assigned, the connection ID is not changed. A description 174 property stores an optional set of comments providing a general description of the connection.

An enabled connection 176 property stores a Boolean variable (writable by an administrator) indicating whether a particular connection is presently enabled. A FromServerName 178 property identifies the source server (which must have a corresponding server proxy object in the sites object)

for the connection. An automatic 180 property stores a Boolean value specifying whether the particular connection is automatically generated.

A replication options 182 property is a bitmask specifying how intersite replication is to be performed. The specified options include "RPC" (which implies non-requested notification), and email (which implies scheduled pull). Other options include authentication methods and encryption techniques to be used.

A schedule 184 property represents the polling schedule to be used by the server to poll the "FromServer" identified by the FromServerName 178 property for the server connection object. If the connection is an intrasite connection, then this value is a worst case replication schedule since any change is automatically replicated to other connected servers in a site. A cost 186 property specifies a value indicating a relative cost for performing communications on the connection. The value stored in the cost 186 is a combination of factors such as, for example: (1) bit transfer rate of the line used by the connection, (2) type of connection (permanent or dial-up), and (3) priority of the server to use the line. The greater the cost, the less this particular connection should be used. Other factors, including actual monetary cost for using the connection, may be included.

Figure 10:
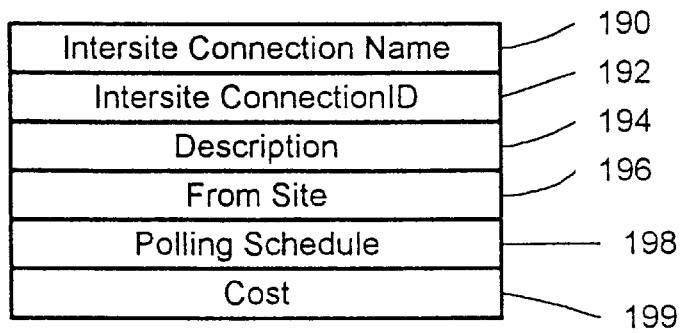
FIG. 10 illustratively depicts a set of properties associated with a site connection object for providing default connection information for any application seeking to utilize the site topology information to perform a network function.

Turning to FIG. 10, the structure is depicted for a site connection object. Site connection objects represent the in-bound half of a link between two sites. The site connection object specifies a default connection for applications that do not require server specific connections. A site connection name 190 property stores a character string identifying the site connection. A site connection ID 192 property stores a globally unique object identification for the site connection object. Once assigned, the connection ID is not changed. A description 194 property stores an optional set of comments providing a general description of the site connection.

A FromSite 196 property stores a globally unique identifier for the source site on the connection (which must have a corresponding site object in the sites object) for the connection. A polling schedule 198 property represents the polling schedule to be used to poll the FromSite. A cost 199 property specifies a value indicating a relative cost for performing communications on the site connection. The determination of cost arises from a cost determination criteria comprising one or more of the cost factors described above with regard to the description of the server connection cost 186.

Locating a Replicated Resource (A Domain Controller)

DS servers (e.g., DS server 62) within domain controllers are associated with a domain and a site. As a domain member, a DS server replicates DS objects to other DS servers. As a site member, the DS server shares close connectivity with other machines within the site, thereby allowing the DS server and clients to identify and preferentially use local (intrasite) resources that are reachable at significantly lower cost than non-local (intersite) resources.

FIGS. 11–14 summarize a set of steps performed in concert by clients, directory servers and domain controllers in order to locate a domain controller (preferably "closest") for a particular client. However, prior to commencing this description three tables of information will be described which perform an integral role in the performance of the procedures in FIGS. 11–14.

The first table, a subnet to site mapping table, comprises a list of subnet addresses and their corresponding sites. This list is generated and stored by a domain controller at startup by consulting the site object property within each subnet object within the configuration container.

The second table, a list of closest sites, comprises a list of sites for which the domain controller is considered "closest" for purposes of setting a "closest" bit in response to a client's ping message. The closest sites include the site within which the domain controller presently resides. The closest sites also includes a set of sites obtained from the site coverage property of the domain object within the directory service of the domain controller. Each value within the site coverage property contains two site names. The first name identifies a site physically containing domain controllers for this domain. The second name is a site name for a site that does not physically contain a domain controller for the domain, but which is considered closest. Each domain controller for this domain in the first site will also register itself as "closest" to clients in the second named site.

Finally, a third table is constructed and maintained by the DNS server for all objects. The third table is the one used by the DNS server to locate and provide a list of domain controllers in response to a clients request for domain controller names for a specified domain and/or site. Therefore, during startup a domain controller registers itself by sending its DNS domain name and site to the DNS server. These pieces of information are stored in the records "ldap.tcp.<DomainName>" and "ldap.tcp.<SiteName>.sites.<DomainName>" and are referenced in response to clients requests to locate a domain controller in accordance with domain controller locator procedures described herein below.

Figure 11:
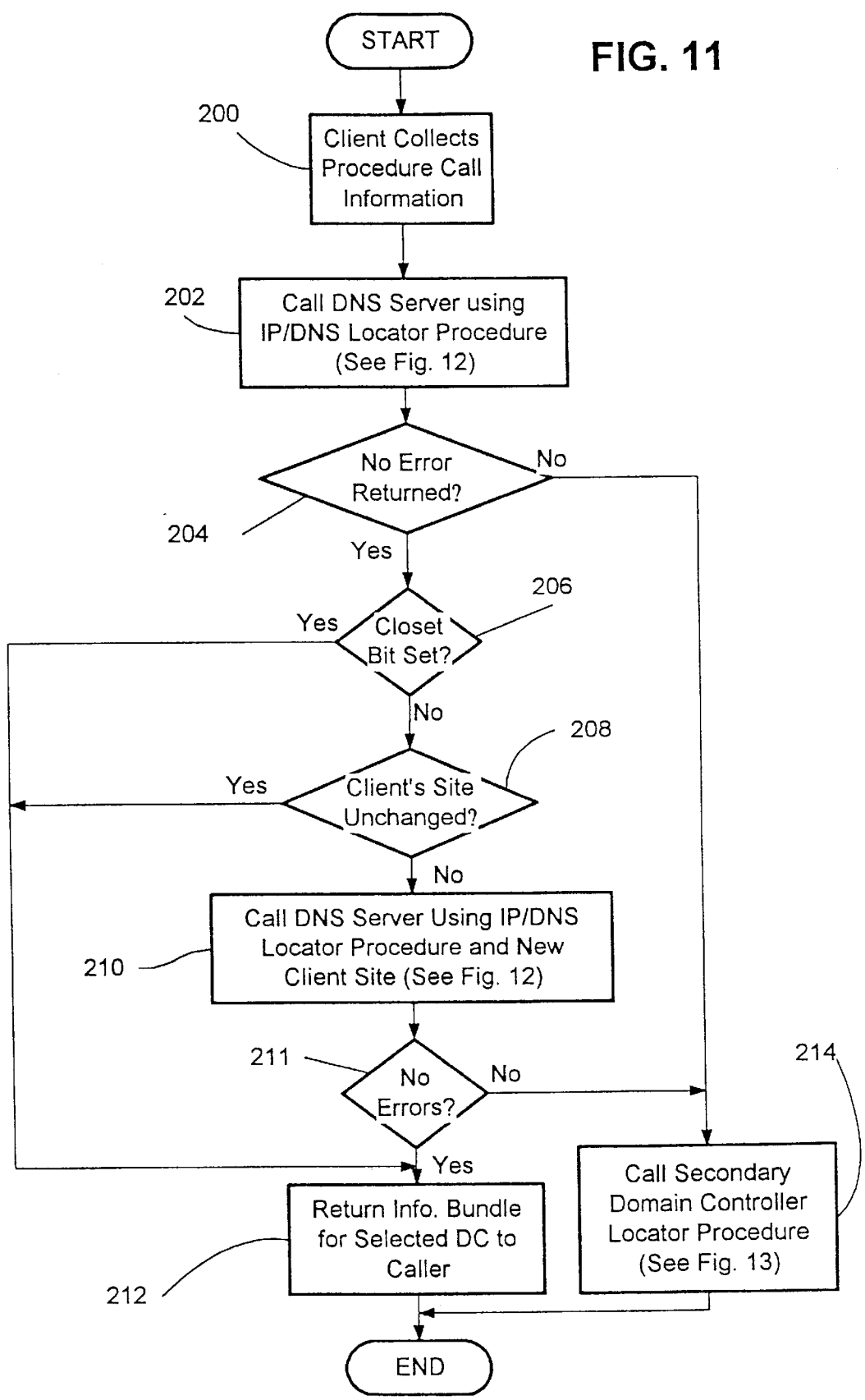
FIG. 11 is a flowchart summarizing the steps performed by a client machine to locate a domain controller with which a requesting caller wishes to establish a connection.

Turning now to FIG. 11, a flow chart illustratively depicts the steps performed in a network embodying the present invention to locate a closest domain controller for a particular client by using the sites information maintained by the directory service. It is noted that while this example relates to determining a domain controller to be used by a client, its general principals are applicable to locating and utilizing virtually any network resource having replicas at multiple sites within a network or to set up links to closest replication partners in order to optimize replication costs.

During step 200, a client collects the information needed to make a procedure call to locate a domain controller for an identified site and domain, and then calls a network logon service to execute the request to locate a domain controller. The collected information includes the name of the server to which the request will be forwarded to perform the network logon. Usually the network logon service resides on the calling client, and therefore this field is NULL. However, this is not a necessary characteristic and indeed the same procedure may be performed via a remote procedure call or a single procedure on the client without the caching and data sharing capabilities of a service. The collected information further includes a domain name, a domain GUID (if known), and site Name (if known) of the client.

The collected information also includes a set of flags designating the manner in which the request will be handled by the network logon service. A first flag bit forces the determination of a closest domain controller even if a domain controller meeting this request is already cached. A second flag, when set, requires that the domain controller support a certain directory service version. Yet another flag specifies a preference for a particular directory service version. Other flags specify additional requirements for the domain controller returned by the network logon service such as global catalog server capability and primary domain controller status. Other flags identify the form of the domain name (e.g., flat or DNS).

At step 202, the network logon service calls the DNS server and performs a set further operations to locate a domain controller. The substeps performed during step 202 are summarized in FIG. 12 (described herein below). The client's service call may include a site name with which the client was last associated, or the site name field may be NULL. The substeps performed during step 202 will either generate a bundle of information identifying a "pinged" domain controller, or an error. This bundle of information will include an identification of the pinged domain controller, an actual site of the client, and a "closest" bit—which is set if the domain controller has been determined to be a "closest" domain controller. The "closest" domain controller determination is summarized in FIG. 14 which is described below.

At step 204, if no error is returned during the course of the client's netlogon service's initial attempt, during step 202, to locate a domain controller, then the bundle of information associated with the "pinged" domain controller is returned and control passes to step 206.

At step 206 if the closest bit has not been set, indicating a failure to find a domain controller "close" to the present site of client, then control passes to step 208.

As previously mentioned above, the bundle of information returned by a pinged domain controller during step 202 contains a site name for the present site of the client which may differ from the site originally submitted during the client's initial query at step 202. At step 208 if the site name returned by the pinged domain controller does not match the site name submitted by the client at step 202, then the client retries its attempt to locate a closest domain controller by again calling the DNS server during step 210. However, during this second pass, the client submits as its site name the client site name returned by the pinged domain controller during step 202.

Upon completion of step 210 the DNS server will have retried locating a closest domain controller using the best available client site information. Therefore, if at step 211 no errors were encountered during the second attempt to locate a domain controller during step 210, control passes to step 212 wherein the network logon service on the client returns a bundle of information containing a designated domain controller regardless of whether the "closest" bit has been set, and control passes to the End of the domain controller locator process.

The bundle of domain controller information returned by the network logon service to the caller during step 212 includes: a domain controller name specified in the form of a character string (in DNS format), a domain controller address specified in the form of a character string, and an address type field (which aids decoding the received address information). The bundle also includes the site name and GUID of the client that originated the call. If such information exists for the selected domain controller, then a domain and/or a site are specified by name and GUID.

The returned data also includes a domain name and the name of the directory service tree including the named domain. Finally, the returned information includes a set of flags identifying any special status of the identified domain controller as well as the format of any names provided in the returned data (e.g., DNS format). Among those flags is the "closest" bit.

The domain controller locating procedure relies first upon a DNS server. However, if at step 204 both IP and DNS are not supported (or unavailable) or the locator was unable to find any domain controller, then control passes to step 214 wherein the network logon service attempts to locate a domain controller by means of the backup domain controller locator procedure summarized in FIG. 13 and described herein below. Control then passes to the End.

At step 206, if the DNS server returns a bundle of information wherein the "closest" bit has been set (i.e., the domain controller meets the closeness criterion), then subsequent calls to the DNS server to find a closest domain controller will not result in the locating of a closer domain controller. Control therefore passes to step 212.

At step 208, if the client's present site name matches the site name submitted by the client to the DNS Server during step 202, then subsequent calls to the DNS server are not likely to render a "closest" domain controller. Therefore control passes to step 212, and the caller receives the bundle of domain controller information notwithstanding the fact that the DNS server was unable to conclude that it is the closest. Finally, similar to the tests at step 204, if errors are detected during the second retry at step 210, then control passes to step 214.

Figure 12:
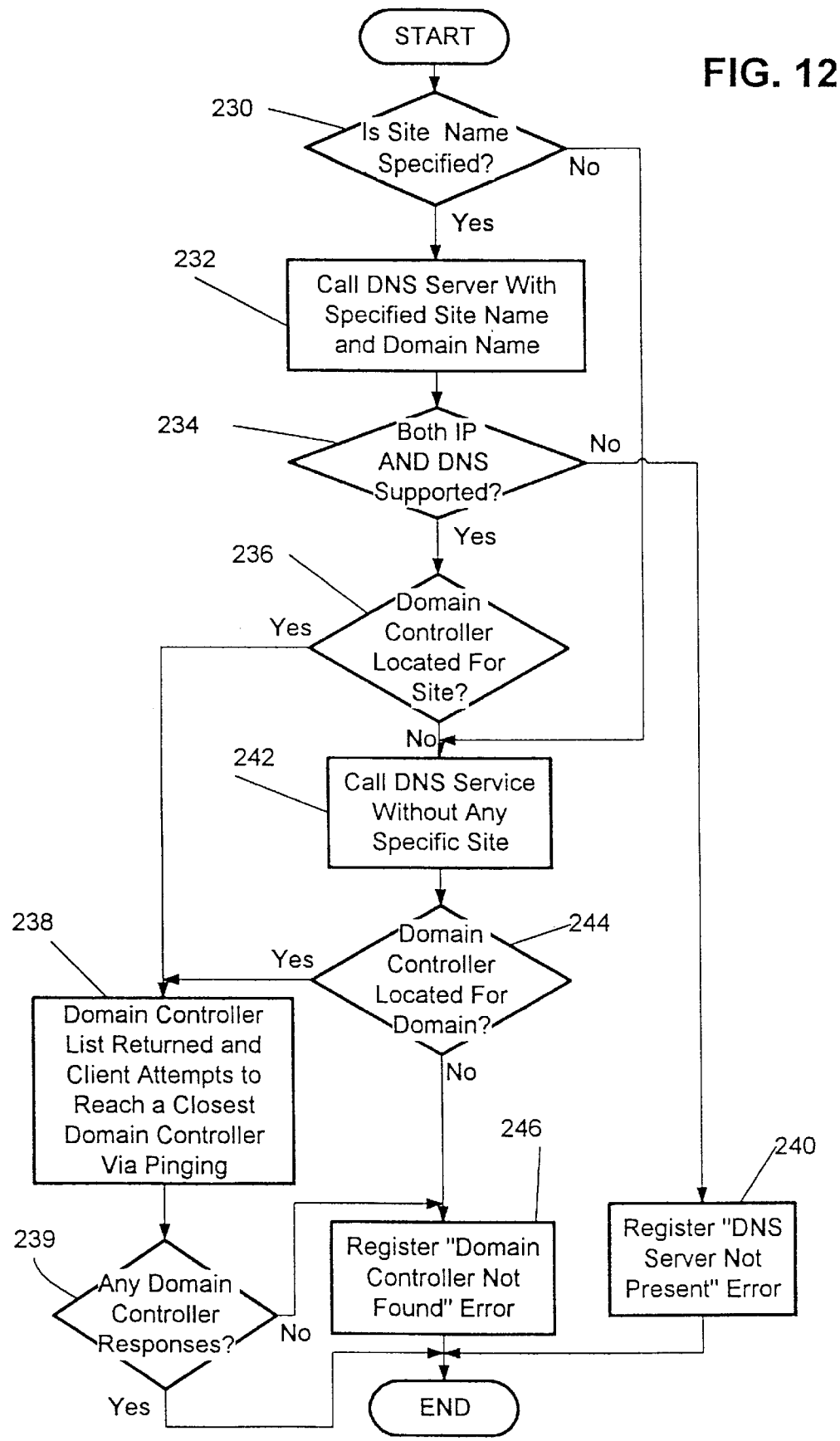
FIG. 12 is a flowchart summarizing the steps performed to locate a domain controller via a site-based directory.

Turning now to FIG. 12, the steps are summarized for the DNS domain controller locator procedure. At step 230, if a site name is specified in the call to the network logon service, then control passes to step 232 wherein the network logon service calls upon the DNS directory service to locate instances of domain controllers associated with the domain and site identified in the network logon request. The DNS server consults a directory, which as explained above has been augmented to include domain and site identifications, and returns domain controller names and IP addresses for domain controllers associated with the specified domain and site.

At step 234 if both IP and DNS are supported by a DNS server, then control passes to step 236. At step 236 if the client receives a return message from the DNS server identifying one or more domain controllers within the specified domain and site, then control passes to step 238.

At step 238, the client pings each of the domain controllers identified by the DNS server during step 232. Each of the pinged domain controllers perform procedures to generate a return message identifying the domain controller, identifying the actual site of the client (based upon the above described subnet to site mapping table generated at startup by the domain controller), and identifying whether the domain controller is a "closest" domain controller. The procedures for determining a closest domain controller are described herein below in conjunction with the steps summarized in FIG. 14.

Continuing with the description of step 238, since the list of domain controllers provided to the client during step 232 may identify several potential domain controllers to which the client may logon. While other domain controller selection procedures may be used, the client in an embodiment of the present invention attempts to ping all of the listed domain controllers and then uses the information contained within the first response indicating an available domain controller.

At step 239, if no response from a qualified domain controller was received by the domain controller during step 238, then control passes to step 246. However, if a responding domain controller is identified, then control passes to the End.

On the other hand, at step 234 if both IP and DNS are not supported by a DNS server, then control passes to step 240 wherein an error is registered and control passes to the End.

At step 230, if the request from the caller does not include a site identification, then control passes to step 242. At step 242, the network logon service on the client calls the DNS server to locate any domain controllers regardless of site affiliation. This step is also entered from step 236 if the DNS server does not locate any site specific instances of domain controllers for the specified domain and site. The DNS server consults its list of domain objects (described above) and identifies the names and IP addresses of the domain controllers specifying the named domain. If any domain controllers are identified for the specified domain, then they are returned to the client.

At step 244, if one or more domain controllers are listed within the return message from the DNS server to the client, then control passes to step 238 wherein the DNS server passes the list of domain controllers (or if the list is extensive some portion thereof) back to the calling network logon service.

Otherwise, if no domain controller identifications were returned by the DNS server, then control passes from step 244 to step 246 wherein the network logon service registers an error indicating that no domain controllers for the specified domain were located by the DNS Server. Control then passes to the End.

It is noted that in the case where no domain controller was located for an identified site, if the network logon service is running upon a domain controller, it could consult the sites topology information within its database to select a "closest" domain controller with which to connect from the list of available domain controllers obtained during step 242.

Figure 13:
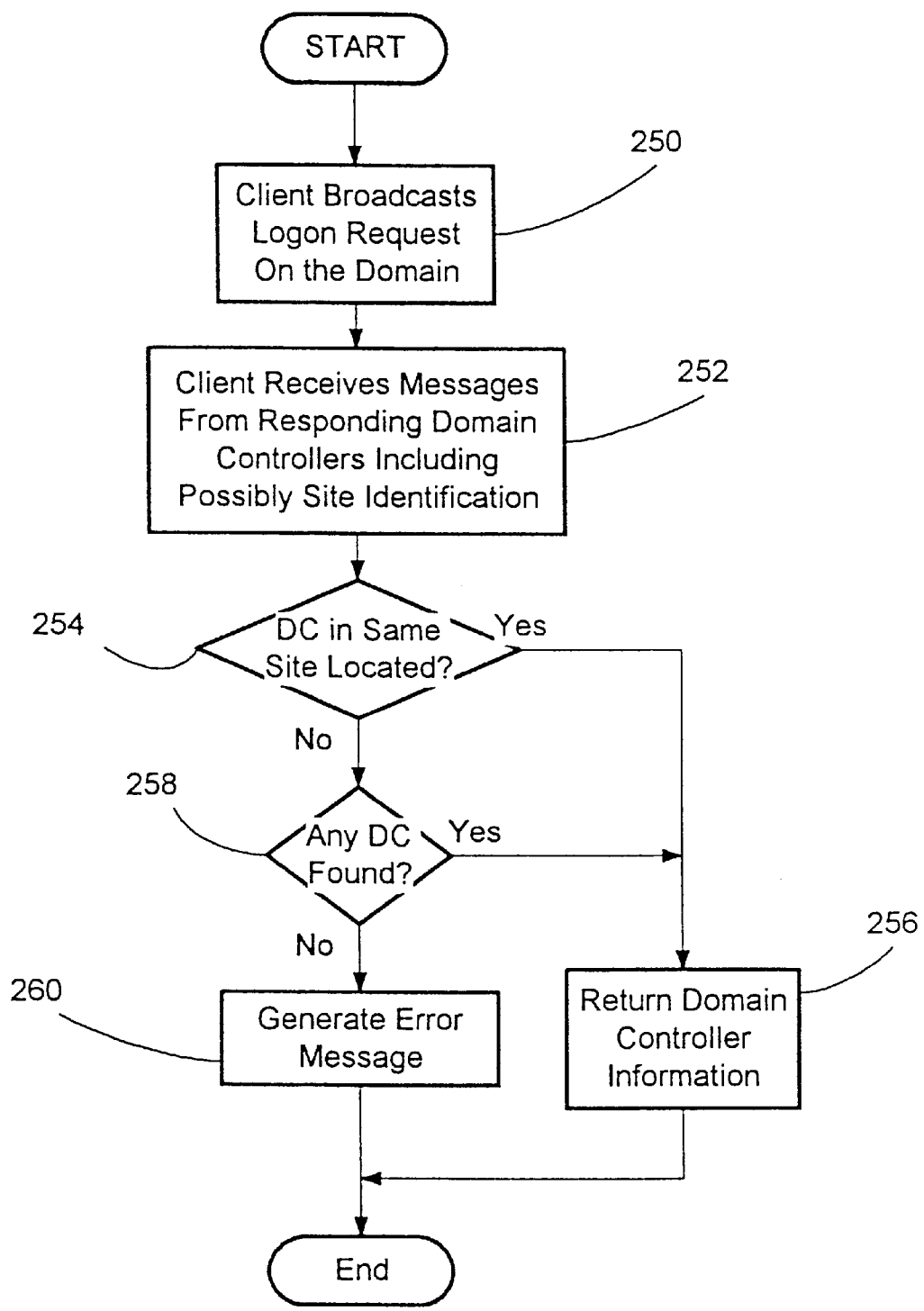
FIG. 13 is a flowchart summarizing the steps performed to locate a domain controller via a secondary domain locator procedure.

Turning now to FIG. 13, the steps are summarized for the secondary domain controller locator procedure which is invoked when the primary, DNS server based, procedure fails to render a domain controller with which the client may connect. At step 250 the client wishing to establish a connection with a domain controller broadcasts a network logon request to the network with an appropriate domain designation. Next, at step 252 the client receives response messages from domain controllers in the identified domain. The returned information, in instances where a domain controller supports sites designations, will include a site identification within the response message.

At step 254, the client attempts to identify a domain controller within its same site. If such a domain controller is identified, then control passes to step 256 wherein the network logon procedure returns the domain controller information for the domain controller which resides within the site. Control then passes to the End.

If at step 254, no domain controllers are located within the client's site, then control passes to step 258. At step 258, if any domain controller has responded to the logon request, then control passes to step 256 wherein the network logon procedure returns the domain controller information for one of the responding sites. The first domain controller to respond is usually the one identified in the information returned during step 256.

At step 258, no DC has responded to the network logon request, then control passes to step 260. At step 260, the network logon procedure generates an error message indicating that no domain controller responded to the network logon request. Control then passes to the End.

Figure 14:
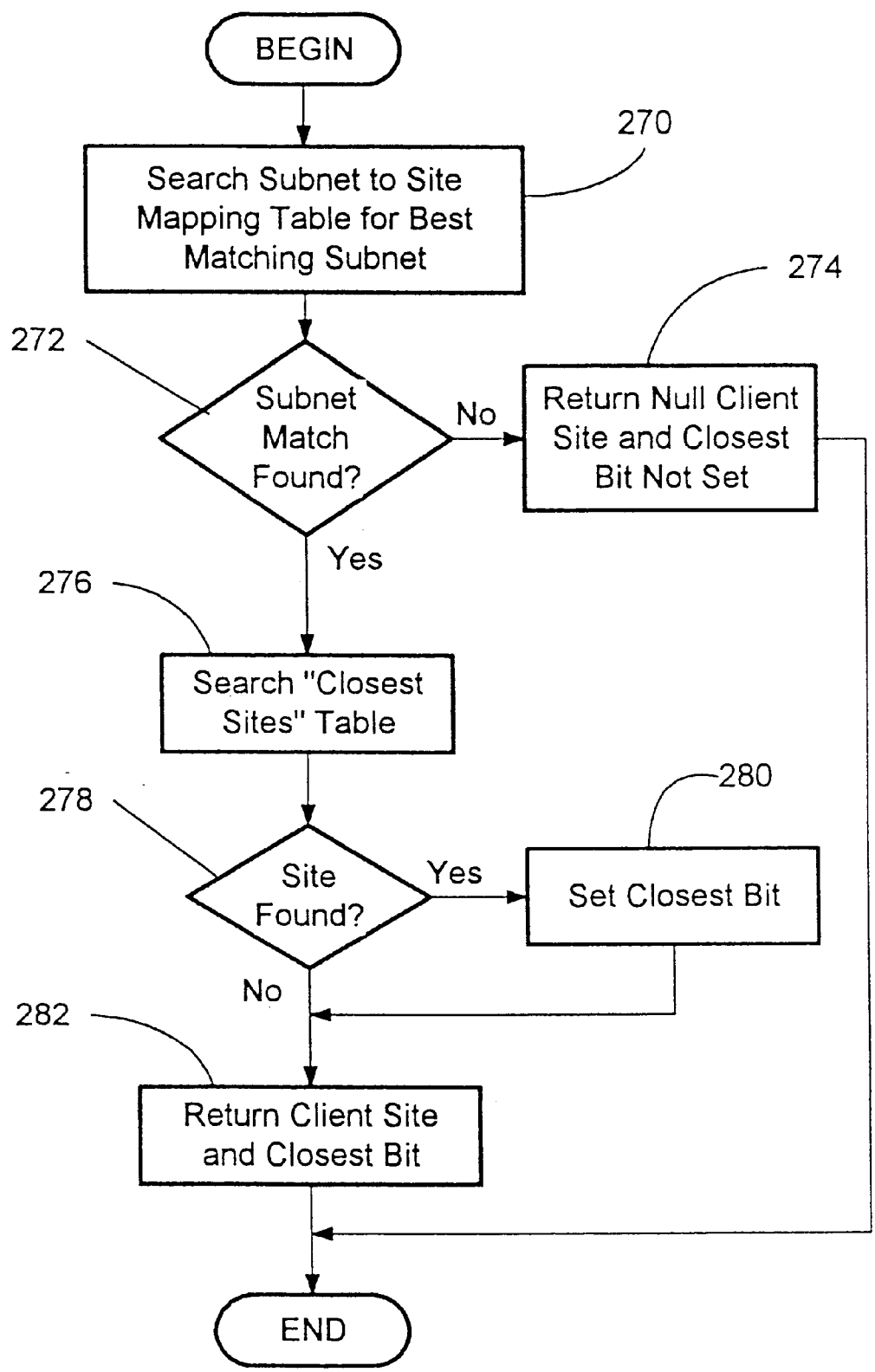
FIG. 14 is a flowchart summarizing the steps performed by a "pinged" domain controller to notify a client whether the pinged domain controller meets a "closest domain controller" criterion for the particular client.

Turning now to FIG. 14, the steps are summarized for a domain controller determining whether it is a "closest" domain controller for a particular client based upon the clients current location. As a preliminary matter is noted that the domain controller maintains a first table which maps subnets to sites. A second table constructed and maintained by the domain controller lists each of the sites for which it is considered to be "close" for purposes of setting the "closest" bit in the return message to a client after receipt of a ping from the client. As will be explained below, the first and second tables, in combination, facilitate the determination by domain controllers whether they are "closest" to a particular client present site.

During step 270, the network logon service of the domain controller compares the internet protocol address of the client to the set of subnets contained within the first table in search of a "best match" for the client. A "best match" refers, in the case of multiple matching entries in the subnet to site mapping table for a given client address, to the subnet identified by the largest number of subnet bits. At step 272, if no match is located, then at step 274 a message is returned indicating that no corresponding subnet was located in the domain controller's subnet to site mapping table for the client's present IP address by placing a NULL value in the client site field. The domain controller information will be provided in the return message to the client, but the closest bit will not be set. Control then passes to the End.

If a subnet match is identified during step 272, then at step 276, the domain controller searches its "closest sites" table for an entry containing the same site as the one indicated for the client's subnet in the domain controller's subnet to mapping table. At step 278, if the client's site is located in the "closest" sites table, then the domain controller sets the "closest" bit in the return message to the client during step 280. At step 282, the domain controller completes the return bundle to the client (taking the previously set or not set closest bit) by adding the domain controller's information and the site identification for the client. Control then passes to the End. If the client's site is not located in the "closest sites" table during step 278, then control passes to step 282 without setting the "closest" bit.

It is noted that the steps of the flowcharts in FIGS. 11, 12, 13, and 14 were described in the context of a network logon service residing on the client. However, in instances of a remote network logon service, the above functions are performed in substantially the same manner. Only minor modifications are implemented to account for the need to make remote calls to another machine to perform the network logon service.

Furthermore, the above procedures for logging onto a network and establishing a connection with a domain controller for purposes of performing network directory service functions is merely an example of many potential useful applications for the sites information and the arrangement of this information in a network topology database as illustratively depicted in FIGS. 5–10. Many other potential uses are contemplated, including those described herein below.

Replication

Sites perform an important role in the synchronization of replicated information within a network. Neighboring sites in a network synchronize time and domain information. Site designations are also used to determine the manner in which replication will occur between particular machines in a network.

By way of the example described briefly above, if a particular domain has multiple domain controllers within a site, then the domain controllers perform intrasit DS object replication in accordance with a notification based intrasite object replication algorithm. Because it is a relatively low cost communication, it is performed on an as needed basis (after a relatively short delay).

However, by definition, intersite communications are relatively costly and therefore should be performed less often where possible. Therefore, in the illustrative embodiment, a domain controller does not notify other domain controllers for which is has established intersite replication links, when the changes occur. Instead, information synchronization over intersite replication links occurs via periodic "polling" which is initiated by the recipients of updated information.

Thus, in a replication environment comprising multiple sites, the site information is used to determine the type of replication to be performed to synchronize replicated information to facilitate efficient use of potentially expensive communication links.

The schedule of propagation between sites is governed by the same repetition periods used for inter-domain propagation. The directory service (within the KDC) consults the appropriate schedules within the domain record to determine when to initiate replication to other sites and to determine whether it is likely that the other sites will accept the effort. On the other hand, propagation of changes within a site are governed by an entirely different set of replication rules—reflecting the considerably lower cost in propagating changes among replicated databases in a same site.

Intersite replication is performed entirely by means of polled-pulling of a server's intersite replication partners (i.e., those for which an intersite replication link exists). Polling by the server of its replication partners is invoked by the occurrence of an event which is not related to a change in the content of an intersite replication partner's database. Examples of such events are the expiration of a pre-configured time period, when a particular replication link is brought on-line, or when the server senses that the link is experiencing a low load.

In contrast, in the illustrative embodiment of the present invention, intrasite replication transactions are initiated by a server, for example a Server_A, after a change has occurred in its information (e.g., a user password is modified). When such a change is detected, Server_A's replication routine is invoked and the changed data is placed in a buffer, and the Server_A invites other servers with which the Server_A maintains an intrasite replication link to poll Server_A's buffer containing the modification information.

It is noted that in an illustrative embodiment of the present invention, rather than immediately notifying its replication partners, the Server_A performs this notification operation after the expiration of a configured time period. More particularly, when the Server_A registers a change to its information, it checks to see if the configured time period has begun. If the time period has not commenced, then Server_A starts this waiting period. If the Server_A receives further changes to its information during this period, then the Server_A buffers the changes. This enables the server to accumulate a set of closely spaced changes and thereby reduce the replication communication load on the system. Upon expiration of the time period, the Server_A notifies its replication partners and deactivates the configured time period in anticipation of the reception of a next change which will restart the period timer.

On the other hand, when a replication partner receives the notification message from the Server_A, it enqueues the message. A separate delay timer periodically checks the message queue. If messages have been registered in its queue, the replication partner queries the buffer of Server_A for the changes which have not yet been replicated to it. It then returns to a sleep state before checking its queue for subsequent changes.

Though a method for executing both intersite and intrasite replication has been disclosed, it should be appreciated that many other replication schemes may be utilized in accordance with other embodiments of the present invention. However, an important feature within each, which is facilitated by the present invention, is the capability of the servers to recognize and distinguish intrasite and intersite replication links. This, in turn, facilitates fine-tuning replication algorithms to maintain reasonably current replicas without incurring unreasonable network communication costs.

Demand Dial Managers and Sites

Figure 15:
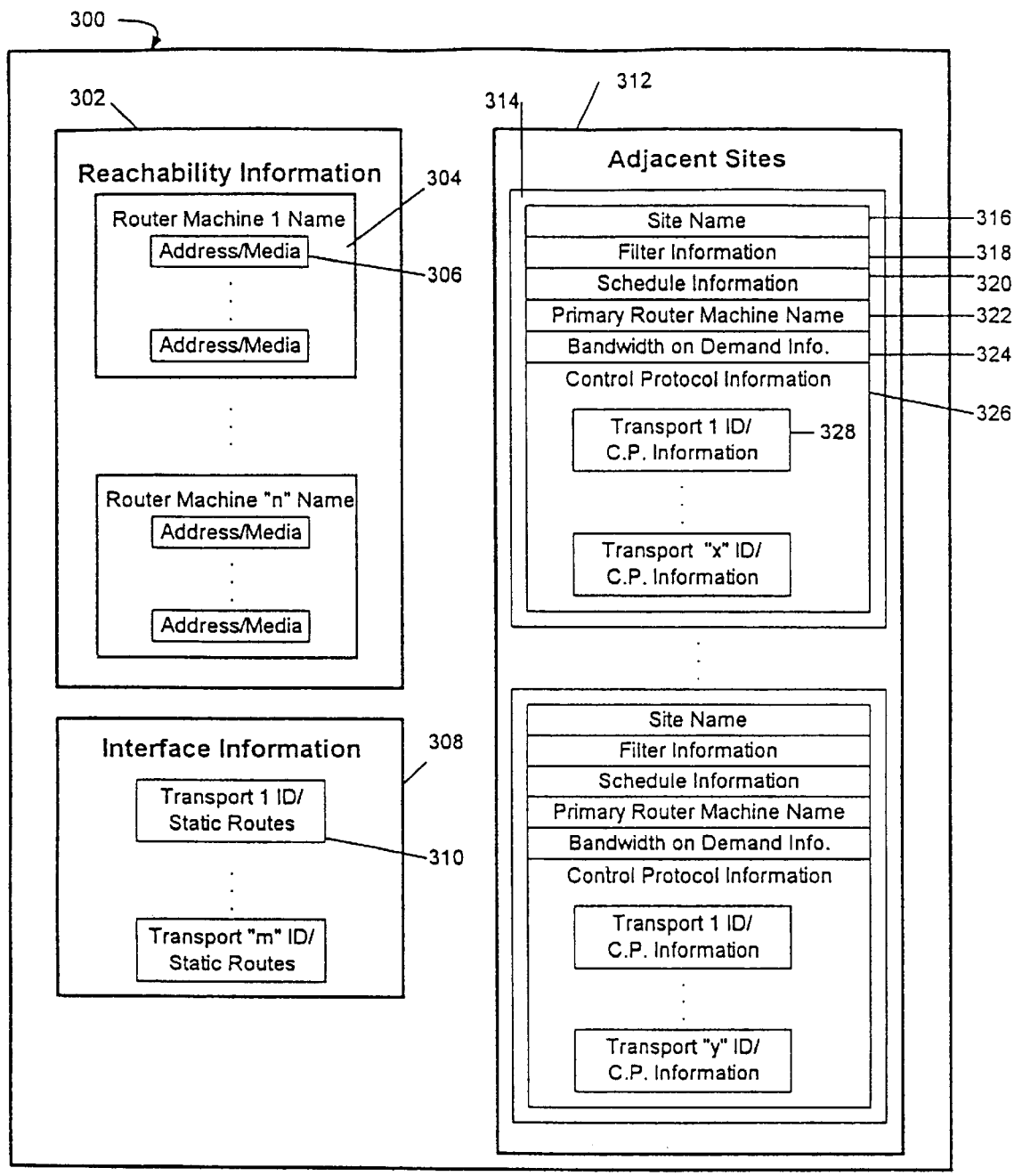
FIG. 15 is a remote access server site object which is generated from the site information provided for a domain and used by a demand dial manager to perform dial-up services for a site.

The sites object is also used by transport routers to implement route selection algorithms. From the site information as well as other information relating to the links between sites provided by the Domain Link Record List, a demand dial manager builds a router site object 300 as shown in FIG. 15. The router site object 300 includes reachability information 302 comprising a set of "In" router records corresponding to the "n" routers located at the site. Each of the "n" router records includes a router identification 304 such as a router name. Each router record also includes a list of address/phone number and media type sub-entries such as the entry 306 (of well known composition).

The router site object 300 also includes interface information 308 comprising a set of "m" entries (e.g., entry 310) corresponding to the set of "m" identified transport protocols provided by the site and the static routes with which each transport protocol is associated.

The router site object 300 also includes a list of adjacent site records 312. Each site record, for example site record 314, corresponds to a directly connectable site and includes a site name 316 and filter information 318.

The site record 314 also includes schedule information 320 identifying the frequency with which the router information is updated by the demand dial manager. A Primary Router Machine Name 322 in the site record 314 specifies the name of the primary router within the adjacent site. Bandwidth on Demand Information 324 specifies whether or not bandwidth on demand is used by the site. If bandwidth on demand is used, then the maximum bandwidth or WAN resources available for the connection are stored. The Information 324 also includes the upper threshold bandwidth utilization level that, when exceeded, requires additional WAN resources. The Information 324 also includes a lower threshold, below which WAN resources are relinquished. The Information 324 also includes a delay period that connection utilization must exceed or fall below the thresholds before the WAN resources are added or relinquished.

The site record 314 also includes control protocol information 326 comprising a set of records identifying transport protocols used by the adjacent site and their associated control protocol information. This information is well known in the art and therefore is not repeated here. The function of this control protocol information is to enable a router to select a particular transport protocol provided by an adjacent site and then initialize a router at the router's site to communicate with the other site using the selected transport protocol.

Figure 16:
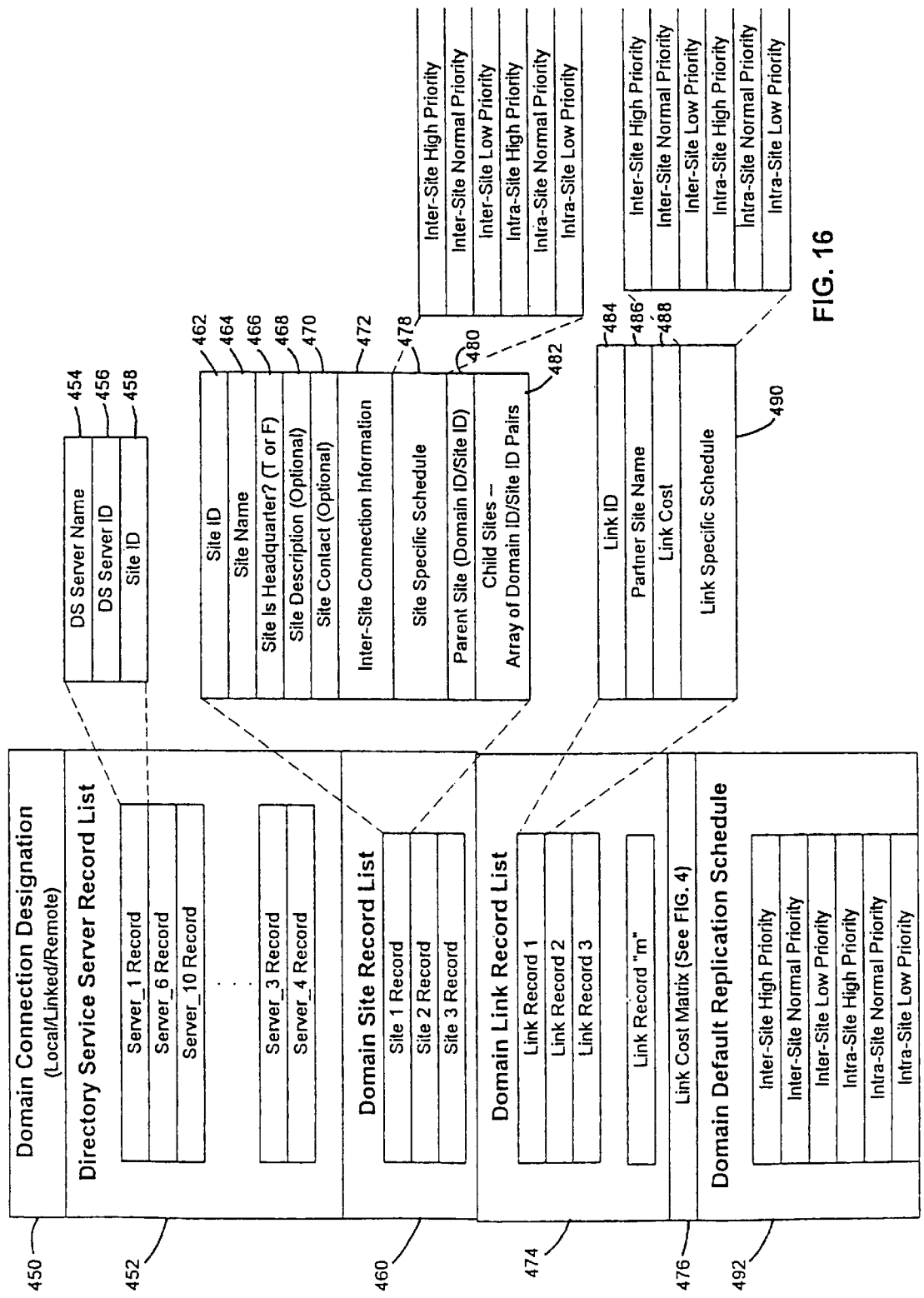
FIG. 16 is a schematic depiction of data structure elements defining portions of a single domain record associated with sites within the domain in accordance with an alternative embodiment of the present invention.

The present invention contemplates various arrangements for containing the sites information for a network. FIG. 16 discloses such an alternative arrangement wherein the sites information is located within a domain container. The domain record includes a domain connection designation 450 identifying whether a particular domain is local, linked, or remote. A local designation indicates that the domain is directly connected without resort to a non-local network communication link such as a phone line. A linked domain is a domain that, while non-local, is reachable via an established network link. Finally, a domain designated as "remote" cannot be directly reached via a link. However, a "remote" domain may be reached via one or more intermediate local or linked domains.

Next, a domain record includes an ordered list of DS server records 452 corresponding to each DS server (also referred to generally as a Domain Controller or DC) in the domain corresponding to the domain record of FIG. 16. The list of domain site records is ordered such that the preferred intersite and intrasite propagator directory service servers are located later in the list of DS server records 452.

Interfaces for listing, positioning, and removing DS Server records in the list 452 enable an administrator to view and modify the presence and preference (list order) of a DS server. Removing a DS server record from the list 452 does not remove the DS server's associated domain controller from the domain. In fact, the domain controller will enumerate the list of DS servers using a view interface, identify the absence of a corresponding entry, and requesting re-insertion of a DS server record in the list of DS server records 452. Instead, removing a domain controller is accomplished by accessing the domain controller itself.

Each DS server record in the list 452 comprises a DS Server Name 454 which is a text string. Each DS server record also includes a DS Server ID 456 which is assigned by the domain security system when a domain controller within which the DS Server resides becomes associated with the domain. The DS Server ID 456 is distinct from all other DS Server ID's assigned within the domain. Each DS server record also includes a Site ID 458 identifying the site with which a DS Server is associated.

When a propagator for a particular site is needed to perform replication, the search for an appropriate DS server commences at the end of the list which, in the current example is the Server_4 Record. If the Site ID for the Server_4 Record designates the site of interest, the search for an appropriate site propagator ends. Otherwise, the searching mechanism moves to the DS Server record immediately above the Server_4 Record and performs the same Site ID query. This DS Server record query continues until a DS Server is identified having the proper Site ID for performing replication or the searching mechanism reaches the top of the DS server record list 452.

In order to define and identify the "sites" within a domain, the domain record includes a set of Site Records 460. As illustratively depicted in FIG. 16, the Site 1 Record, and all of the site records include a number of entries containing descriptive information for a site. The Site ID 462 is a globally unique identifier (GUID) assigned to the site. It is the authoritative value for identifying a site. Because of its importance in identifying the site, the Site ID 462, once assigned to a site, is not changed. A Site Name 464 is a string name for a site. In the case of Site 31 (in FIG. 2), the Site Name 464 is "Los Angeles." The site name, while useful for identifying a site, is not authoritative and can be changed.

Each Site Record includes a SiteIsHeadquarter Boolean value 466. If the value 466 is true, then the site must have copies of all DS objects in the domain. If the value 466 is false, indicating that the site is associated with a branch office or hard-to-reach site where complete copies are either unnecessary or impractical, then only a portion of the DS objects are copied to the site.

Next, for purposes of administration and a better understanding of a particular site, a Site Description 468 is included. The Site Description 468 annotates important summary information regarding the site with which it is associated. The Site Description 468, while useful, is not mandatory. A Site Contact 470 typically identifies a person responsible for administering and maintaining the site. This information is also optional.

Each site record also includes intersite connection information 472. The intersite connection information 472 comprises a list of Link IDs which identify, by GUID, links connecting the site to other, neighboring sites. The link GUIDs are used to reference specific link information entries within Link Information records 474 described below. A set of interface functions are provided enabling an administrator to add a link to a site, enumerate the sites linked to the site, and remove a link to the site.

The Link Information records 474 are used by a DS Server to compute a site inter-connection cost matrix 476. In an embodiment of the invention the site inter-connection cost matrix 476, illustratively depicted in FIG. 17, identifies all connected sites and the number of links that must be traversed to send and receive data between the identified sites. Thus, the cost for reaching a given destination site from an originating site is the number of "jumps."

Other, more sophisticated, cost matrices may include such factors as bandwidth limitations, link traffic, charge per use of the line (for example phone line charges), etc. However, as will be appreciated by those skilled in the art, such information presents additional computational and administrative overhead.

FIG. 17 illustratively depicts the site connection costs for the set of sites depicted in FIG. 2. The values in the intersite cost matrix 476 are computed from administrator-supplied connection information. Site 3 is connected directly to Sites 1 and 2 and therefore the intersite cost between those sites is "1"—or 1 jump. From these values, other entries are computed for the intersite cost matrix 476. In particular, Site 1 and Site 2 are connected via Site 3 and therefore the intersite cost between Site 1 and Site 2 is "2"—or 2 jumps. Entries along a diagonal of the site cost matrix (e.g., Site 1 to Site 1) are inapplicable in this embodiment of an intersite connection cost matrix 476. While not included in the exemplary domain illustrated in FIG. 1, it is noted that domain sites may be connected to sites in other domains. In such a case, these site connections and their associated costs are included in the intersite cost matrix 476.

Continuing the description of FIG. 16, each site record includes a site-specific schedule field 478. The site-specific schedule field 478 includes six (6) sub-fields. An intersite high priority field defines the frequency at which the site, corresponding to the site record, replicates "urgent" changes to neighboring sites (either in, or outside of, the same domain). The default value for intersite high priority exchange frequency is once every hour. Next, an intersite normal priority schedule identifies the normal repetition period for replicating changes to neighboring sites. The default value for intersite normal priority replication is four (4) hours. An intersite low priority schedule identifies the repetition period for replicating low priority changes to neighboring sites. The default value for intersite low priority replication is twelve (12) hours.

The remaining three sub-fields in the site-specific schedule field 478 are site-specific values specifying repetition periods for replicating changes to other domain controllers within the site. In particular, an intrasite high priority field specifies a repetition period defining the rate at which domain controllers replicate "urgent" changes to the other domain controllers within a same site. The default value for intrasite high priority exchange frequency is once every hour. Next, an intrasite normal priority schedule identifies the normal repetition period for replicating changes to other domain controllers within the site. The default value for intrasite normal priority replication is eight (8) hours. An intrasite low priority schedule identifies the repetition period for replicating low priority changes to the other domain controllers within the site. The default value for intrasite low priority replication is twenty-four (24) hours.

Though not necessary, sites may be arranged in a tree-structure hierarchy. In such cases, a single parent site is identified by Domain ID and Site ID in a Parent Site 80. In addition, the site may have child sites. The child sites are stored in an array of Domain ID/Site ID pairs in a Child Sites Array 82.

In an embodiment of the present invention, linked domains contain only one site record in the Domain Site Record List 60. This is true even if a linked domain has more than one site. The reason for this rule in this embodiment of the invention results from the desire to have only one site within a domain designated as the inter-domain propagator site and therefore the locator of a KDC (e.g. KDC 30) needs information for only this site. As a result, all inter-domain traffic passes through one of the DS servers in the single identified site. Non-linked domains, while possibly including multiple sites, also have a distinguished site within the domain responsible for propagating information within the domain.

Having described the contents of the Domain Site Record List 460, attention is now directed to the Domain Link Record List 474 that contains entries identifying the links connecting the sites of the domain to other sites both within and outside of the domain. Each link record, such as Link Record 1 includes a plurality of fields identifying a Link between two sites and information relating to utilization of the link. Each link record includes a Link ID 484 which is a GUID corresponding to a GUID specified in the Intersite Connection Information 472 for a site. The originator site of a link is specified by the site name 464 with which a link record is associated, and the partner site (the other end of the link) is identified in the Partner Site Name 486. In addition, a link cost 488 is specified for the link. In an embodiment of the present invention, the value of the link cost 488 is a relative value representing a general desirability of ease of communicating on the associated link. When a particular resource can be obtained via two or more distinct links, a comparison is executed with respect to the links to determine which link to use. Each link record is capable of specifying a link specific schedule 490 that will over-ride the site-specific schedule in the event that the period stated in the site specific schedule is less than the period specified in the corresponding link specific schedule to prevent over-use of the link. The default periods specified in the link specific schedule are the same as the defaults described above with regard to the site specific schedule 478.

Finally, the domain record also specifies a set of default replication periods in a Domain Default Replication Schedule 492. The default values are identical to the values specified above for the site specific schedule 478. The values specified within the Domain Default Replication Schedule 492 occupy the lowest priority with regard to the replication schedules 478, 490 and 492. Therefore, in the event that a period specified in a sub-field of the Domain Default Replication Schedule 492 is less than a corresponding period in either the site specific schedule 78 or link specific schedule 490, then the greater value specified in the site specific schedule 478 or link specific schedule 490 is used to perform replication.

Though rendered unnecessary in the instance of the domain controller locator procedure summarized in FIGS. 11–14, in other instances wherein the search mechanisms are not applied at the time a request is submitted, a referral order may be established which takes into consideration the connectivity of a particular set of resources. Turning to FIG. 18, a referral order, generated by a DS Server, is illustratively depicted that corresponds to the Intersite connection cost matrix depicted in FIG. 17. The referral order is used to establish a preference list for connecting to a source for a particular requested object. For example, if a volume is replicated, the clients use the referral order to connect to a replica server with the least associated cost. Site Markers separate groups of machines that are equally accessible (i.e., located at the same site). The referral order does not specify costs, only equally preferred machines from the point of view of accessibility in an order list according to relative accessibility.

In particular, with respect to FIG. 18, a client located at Site 1 preferentially accesses Machine (1,1) and Machine (1,2) which are also located at Site 1. Machines (3,1) and (3,2) associated with Site 2 are less preferred to Site 1 machines. Finally Machine (2,1) associated with Site 2 is even less preferred because, as illustrated in FIG. 1, two links must be traversed.

The embodiments of the present invention illustrated in the drawings and discussed above were chosen and described to illustrate the principles of the invention and its practical application to thereby enable one of ordinary skill in the art to utilize the invention in accordance with the disclosed embodiments and various suggested modifications as suited to particular other contemplated uses of the invention. Such modifications and variations are within the scope of the invention as determined by the appended claims when interpreted in accordance with the breadth to which they are fairly, legally, and equitably entitled.

There is no intent to limit the invention to the disclosed embodiment. On the contrary, the intent is to cover all alternatives, modifications and equivalents included within the spirit and scope of the invention as defined by the appended claims.

What is claimed is:

1. In a network comprising a set of linked sites, a naming service comprising a list of resources and their associated sites and logical group, and replicated resources existing within multiple sites within the network registered with the naming service, a method for selecting and initiating access to the replicated resources based upon logical grouping and proximity to a requesting client comprising the steps of:

receiving, by the naming service, a request to identify a replica of a resource to which the requesting client wishes to obtain access, the request identifying a site and logical group, and in response consulting a directory comprising the list of resources and associated sites;

providing a response specifying at least one replica of the resource within the specified site and logical group; and attempting to access a replica specified in the response.

2. The method of claim 1 further comprising the steps of:

determining that none of the replicas specified in the response meets a closeness characteristic;

determining a current site within which the requesting client resides;

determining that the site specified in the request did not identify the current site of the requesting client wishing to access a replica of the resource; and submitting a second request specifying the logical group and the current site of the client.

3. The method of claim 1 further comprising the steps of:

determining that no replicas exist for the specified site and logical group, and in response generating a list of replicas of the resources that are associated with the logical group, wherein the list includes a replica of the resource which meets a closeness characteristic but does not match the specified site.

4. The method of claim 3 wherein the replica meeting the closeness characteristic is identified from a closest sites table identifying the sites which are considered closest to the specified site.

5. The method of claim 4 wherein the resource is a network request server.

6. In a network comprising a set of linked sites, a naming service comprising a directory of resources, and replicated resources existing within multiple locations within the network, a method for configuring network directories to facilitate identification of resources by logical and topological relation to requesters of the resources comprising the steps of:

registering an identification associated with an instance of a replicated resource;

registering a logical group with which the instance of a replicated resource is associated; and registering a site with which the instance of a replicated resource is associated.

7. The method of claim 6 further comprising generating a list of sites for which a resource is considered closest.

8. The method of claim 6 wherein sites are further sub-divided into subnets, further comprising the step of:

generating a table correlating subnets to sites.

9. The method of claim 8 wherein a subnet is specified by a partial Internet Protocol address.

10. A network facilitating identification of resources by logical and topological relation to requesters of the resources comprising:

a set of locally linked computer networks;

a set of remote links interconnecting the set of locally linked computer networks;

replicated resources residing on the set of locally linked computer networks;

client computers residing on the locally linked computer and communicatively coupled to the replicated resources; and a naming service communicatively connected to the client computers and comprising a directory of replicated resources, said directory of replicated resources comprising for instances of the replicated resources: a first field identifying a logical group with which an instance of a resource is associated and a second field identifying a site within which the resource resides.

11. The network of claim 10 wherein the replicated resources comprise directory service servers.

12. The network of claim 11 wherein instances of the directory service servers are associated with a logical group and a site, and include means for determining whether a particular instance of the directory service server meets a closeness characteristic with regard to a particular requester of access to the instance of the directory service server.

13. The network of claim 12 wherein the means for determining whether a particular instance of the directory service server meets a closeness characteristic includes:

means for determining the locally linked computer network within which a requester presently resides; and means for detecting a match between the locally linked computer network of the requester and a set of locally linked computer networks to which the directory service server is considered closest, and in response generating a response indicating that the particular instance of the directory service server is a closest instance.

14. The network of claim 13 wherein the directory service server comprises means for generating a response message specifying the locally linked computer network within which the requester presently resides.

15. The network of claim 10 further comprising:

connection type designators identifying intersite and intrasite connections; and replication facilities including a first replication mechanism for performing intrasite replication, and a second replication mechanism for performing intersite replication, and wherein the first and second replication mechanisms are selectively utilized to perform replication in accordance with values specified for replication links by the connection type designators.

16. In a network including a set of locally linked computer networks, a set of remote links interconnecting the set of locally linked computer networks, replicated resources residing on the set of locally linked computer networks, and client computers residing on the locally linked computer and communicatively coupled to the replicated resources, a naming service communicatively connected to the client computers facilitating identification of resources by logical and topological relation to requesters of the resources comprising:

a directory of replicated resources, said directory of resources including for instances of the replicated resources a first field identifying a logical group with which an instance of a resource is associated and a second field identifying a site within which the resource resides; and means for registering individual instances of the replicated resources within the directory of replicated resources.

17. In a network comprising a set of linked sites, replicated resources residing within multiple sites on the network, and a naming service comprising a directory of resources including directory tables facilitating identification of requested resources by logical and topological designation, a method for informing a requesting client of the existence of a closest server relationship between a server and the requesting client comprising the steps of:

identifying an actual network site within which the requesting client resides;

comparing the actual network site to a list of sites to which the server is considered closest; and notifying the requesting client in the event that a match is identified during the comparing step.

18. The method of claim 17 wherein the list of sites includes a set of sites which are considered closely linked to the site within which the server resides.

19. A computer readable medium having computer-executable instructions for a computer to perform, in a network comprising a set of linked sites, replicated resources residing within multiple sites on the network, and a naming service comprising a directory of resources including directory tables facilitating identification of requested resources by logical and topological designation, a method for informing a requesting client of the existence of a closest server relationship between a server and the requesting client, the method including the steps of:

identifying an actual network site within which the requesting client resides;

comparing the actual network site to a list of sites to which the server is considered closest, wherein the list of sites includes a set of sites which are considered closely linked to the site within which the server resides; and notifying the requesting client in the event that a match is identified during the comparing step.

20. Computer readable medium having computer-executable instructions for selecting and initiating access to replicated resources, in a network comprising a set of linked sites, a naming service comprising a list of resources and their associated sites and logical group, and replicated resources existing within multiple sites within the network registered with the naming service, by performing in the network the steps of:

receiving, by the naming service, a request to identify a replica of a resource to which a requesting client wishes to obtain access, the request identifying a site and logical group, and in response consulting a directory comprising the list of resources and associated sites;

providing a response specifying at least one replica of the resource within the specified site and logical group; and attempting to access a replica specified in the response.

\* \* \* \* \*